United States Patent [19]

Blanc

[11] Patent Number: 5,204,883
[45] Date of Patent: Apr. 20, 1993

[54] METHOD AND APPARATUS FOR RECOGNITION OF A FRAMING PATTERN DISTRIBUTED IN A SERIAL BIT STREAM

[75] Inventor: Alain Blanc, Vence, France

[73] Assignee: International Business Machines Corporation, Armonk, N.Y.

[21] Appl. No.: 693,894

[22] Filed: May 1, 1991

[30] Foreign Application Priority Data

May 15, 1990 [EP] European Pat. Off. ........ 90480068.7

[51] Int. Cl.$^5$ .............................................. H04L 7/00
[52] U.S. Cl. ...................................... 375/116; 307/231
[58] Field of Search ................. 375/116, 114; 370/105, 370/105.1; 340/825.65, 825.68; 307/510, 231

[56] References Cited

U.S. PATENT DOCUMENTS 4,607,378 7/1986 Catlin et al. .......................... 375/116

FOREIGN PATENT DOCUMENTS 1219977 3/1987 Canada .
0262478 9/1987 Fed. Rep. of Germany .
59-99001 2/1985 Japan .................................. 375/116

OTHER PUBLICATIONS

IBM TDB vol. 31, No. 7, Dec., 1988 pp. 161-167.

Primary Examiner—Curtis Kuntz
Assistant Examiner—Tesfaldet Bocure
Attorney, Agent, or Firm—Joscelyn G. Cockburn

[57] ABSTRACT

Method and apparatus for recognizing of a framing pattern of M single bits distributed at intervals of a fixed number, N of bits, as measured from the start of one framing bit to the start of the next, in an incoming serial bit stream. The system makes a computation following each reception of an arbitrary group of N incoming data, and after the minimum number of computation steps to distinguish between a 'look-alike' framing pattern and a 'true' framing pattern, points out with no ambiguity the very position of the "true" pattern within the bit stream, thus allowing synchronization over that stream.

8 Claims, 6 Drawing Sheets

```
INCOMING BIT STREAM:
..010001010001100010101010H1111010001010010101101110...

INITIALIZATION:
M=6
S(0-5)                          = 00000000 00000000 11111111 11111111 00000000 00000000
HOUSEPOS=4
A(0-5)                          = 11111111 11111111 11111111 11111111 11111111 11111111
SEARCHABORT=0  SEQUENUMB=0  PATTERNFOUND=0

COMPUTING SEQUENCE 1:
S(0-5)                          = 00000000 11111111 11111111 11111111 00000000 00000000
C                               = 01000101 01000101 01000101 01000101 01000101 01000101
S(0-5) XORNOT C                 = 10111010 01000101 01000101 01000101 xxxxxxxx 10111010
AND A(0-5)                      = 10111010 01000101 01000101 01000101 11111111 10111010
SEQUENUMB=1  HOUSEPOS=3

COMPUTING SEQUENCE 2:
S(1-5,0)                        = 11111111 11111111 11111111 00000000 00000000 00000000
C                               = 00001100 00001100 00001100 00001100 00001100 00001100
S(1-5,0) XORNOT C               = 00001100 00001100 00001100 xxxxxxxx 11110011 11110011
AND A(0-5)                      = 00001000 00000100 00000100 01000101 11110011 10110010
SEQUENUMB=2  HOUSEPOS=2

COMPUTING SEQUENCE 3:
S(2-5,0,1)                      = 11111111 11111111 00000000 00000000 00000000 11111111
C                               = 01010H11 01010H11 01010H11 01010H11 01010H11 01010H11
S(2-5,0) XORNOT C               = 01010u11 01010u11 xxxxxxxx 10101u00 10101u00 01010u11
AND A(0-5)                      = 00000000 00000000 00000u00 00000100 00000u00 10100000 00010010
SEQUENUMB=3  HOUSEPOS=1
```

COMPUTING SEQUENCE 4:

S(3-5,0-2)         = 11111111 00000000 00000000 11111111 11111111
C                  = 11010001 11010001 11010001 11010001 11010001
S(3-5,0-2) XNOT C  = 11010001 xxxxxxxx 00101110 11010001 11010001
AND A(0-5)         = 00000000 00000u00 00000100 10000000 00010010
SEQUENUMB=4 HOUSEPOS=0

COMPUTING SEQUENCE 5:

S(4,5,0-3)         = 00000000 00000000 11111111 11111111 11111111
C                  = 01001001 01001001 01001001 01001001 01001001
S(4,5,0-3) XNOT C  = xxxxxxxx 10110110 10110110 01001001 01001001
AND A(0-5)         = 00000000 00000u00 00000100 00000000 00000000
SEQUENUMB=5 HOUSEPOS=5

COMPUTING SEQUENCE 6:

S(5,0-4)           = 00000000 00000000 11111111 11111111 00000000
C                  = 01101110 01101110 01101110 01101110 01101110
S(5,0-4) XORNOT C  = 10010001 10010001 01101110 01101110 xxxxxxxx
AND A(0-5)         = 00000000 00000u00 00000100 00000000 00000000
PATTERNFOUND=1

H: HOUSEKEEPING BIT (COULD BE 0 OR 1)
x: NOT COMPUTED
u: UNKNOWN VALUE

FIG. 5B

METHOD AND APPARATUS FOR RECOGNITION OF A FRAMING PATTERN DISTRIBUTED IN A SERIAL BIT STREAM

BACKGROUND OF THE INVENTION

1) Field of the Invention

The present invention relates generally to obtaining synchronization between two telecommunication devices, and more specifically to recognizing in an incoming bit stream, a framing pattern of M single bits distributed at constant intervals of a fixed number N, of bits, as measured from the start of one framing bit to the start of the next.

2) Prior Art

In telecommunication industry, communication between devices consists quite often in two separate serial bit streams in opposite directions, each device being the 'emitter' for one serial bit stream, and the 'receiver' for a second stream. Some sort of synchronization convention is necessary between the emitter and the receiver so that they can 'talk' to each other. For that purpose, a technique widely used consists in the emitting device repeatingly embedding in the transmitted bit stream, a preassigned M-bit framing pattern that is distributed at constant intervals of a fixed number, N, of bits, as measured from the start of one framing bit to the start of the next, and the receiving device recognizing the M-bit pattern in the bit stream thus allowing synchronization so that the rest of the bit stream can make sense.

This technique is for example used in CCITT recommendation X.50 in an effort to standardize a preferred multiplexing scheme to be used on links between different countries. In that case, data transmission is achieved at 64 kbps, the bit stream being a sequence of 8-bit envelopes as follows:

...DDSFDDDDDDSFDDDDDDSFDDDDDS-FDDDDDDSFDDDDDD....

where
- D is the data transmitted
- S is a status bit
- F is a framing bit part of the 20-bit framing pattern being: A11010010000010101110
- (A is a signalling bit)

This technique is also used in Italian CDN network as defined in 'Capitolato tecnico Nr.1222 Apparecchiature DCE' and 'Capitolato tecnico Nr.1267 Apparecchiature DCE-2' from SIP (Societa Italiana per l'Esercizio delle Telecomunicazioni'). In that case, data transmission is achieved at 72 kbps, the bit stream being a sequence of 9-bit envelopes as follows:

...TFDDDDDDSTFDDDDDDSTFDDDDDDS-TFDDDDDDSTFDDD....

where
- D is the data transmitted
- S is a status bit
- T is: 10H10H10H10H... (H: housekeeping bit)
- F is a framing bit part of the the 20-bit framing pattern as above Finally this technique is used to a certain extent for multiframing purpose on the ISDN Basic Rate Interface (192 kbps).

Therefore it is of major importance, for the man skilled in the art, that a system achieving fast and secure synchronisation on such a distributed framing pattern (pattern of M bits embedded in the serial data stream at intervals of N bits) be implemented in telecommunication products. A prerequisite to that synchronization is a fast and secure recognition of the framing pattern.

U.S. Pat. No. 4,611,336 to Fryer describes a method and associated system for frame synchronisation for serial bit streams having an embedded framing pattern. The method consists in extracting from the bit stream, consecutive groups of N bits, incrementing or resetting N associated counters depending on the coincidence or not of each one of the N bits with an expected bit of the framing pattern. When one of the N counters reaches M, recognition of the pattern is said to be achieved, thus synchronization made possible.

European Patent Application 0 161 177 to Bojarski also describes a method and associated system for achieving synchronisation on serial bit stream. But method consists in extracting M bits from the bit stream, said M bits incoming at intervals of N bits, and comparing the M-bit word thus obtained with the framing pattern or its (M-1) rotations. Synchronisation is said to be achieved if comparison is true logically This system requires quite a bit of fast hardware depending on the speed of the incoming data stream.

Both methods have the main following drawbacks:
Poor security: there is always a chance for a 'look-alike' M-bit pattern to be detected in the data portion of the bit stream and the synchronization flagged as being achieved when it is actually not (resulting in a time-consuming recovery process after a fake synchronization). To avoid this, double or triple checking is made necessary (counter reaching a multiple of M in U.S. Pat. No. 4,611,336 to Fryer; once pattern is detected, having to confirm it with a new search in European Patent Application 0 161 177 to Bojarski).

Low speed of synchronisation: this speed is dependant probability of 'taking a good start' in the pattern search.

SUMMARY OF THE INVENTION

The present described system distinguishes mainly over prior art in that instead of looking for the pattern in the bit stream and making sure it persists over the time, the system makes a computation over the bit stream and points out with no ambiguity and in the minimum time, necessary to distinguish between a 'look-alike' pattern located in the data portion of the stream and a 'true' framing pattern, the very position of that framing pattern within the bit stream.

It is an object of the present invention to provide a system for achieving fast and secure recognition of a M-bit predefined framing pattern distributed at intervals of N bits in an incoming serial bit stream.

It is a further object of the present invention to provide after pattern-recognition, the necessary inputs for a telecommunication device to be able to synchronize over the incoming serial bit stream.

It is another object of the invention to be able to handle framing pattern types that include one housekeeping bit that differs from the (M-1) other bits of the pattern in that its value can vary from one pattern sequence to the other.

It is a feature of the invention to provide a programmable system that can be implemented in very many different telecommunication devices attached to very many different network types with different framing patterns.

DESCRIPTION OF THE PREFERRED EMBODIMENT

Implementation of the invention in a telecommunication device is obviously very dependant upon the type of network, that a device is going to be attached to. It will be easily understood that this implementation will thus depend on the framing pattern used in the network, i.e. its three determining parameters: its number M of bits, the number N of bits between two bits of the pattern distributed in the incoming bit stream, and also the binary value of the pattern itself.

For a better understanding, we will from now on describe the invention in a preferred embodiment, with reference to a particular pattern where M equals 6, N equals 8, and pattern itself is worth 0111H0 (H : housekeeping bit can equal 0 or 1).

Figure 1:
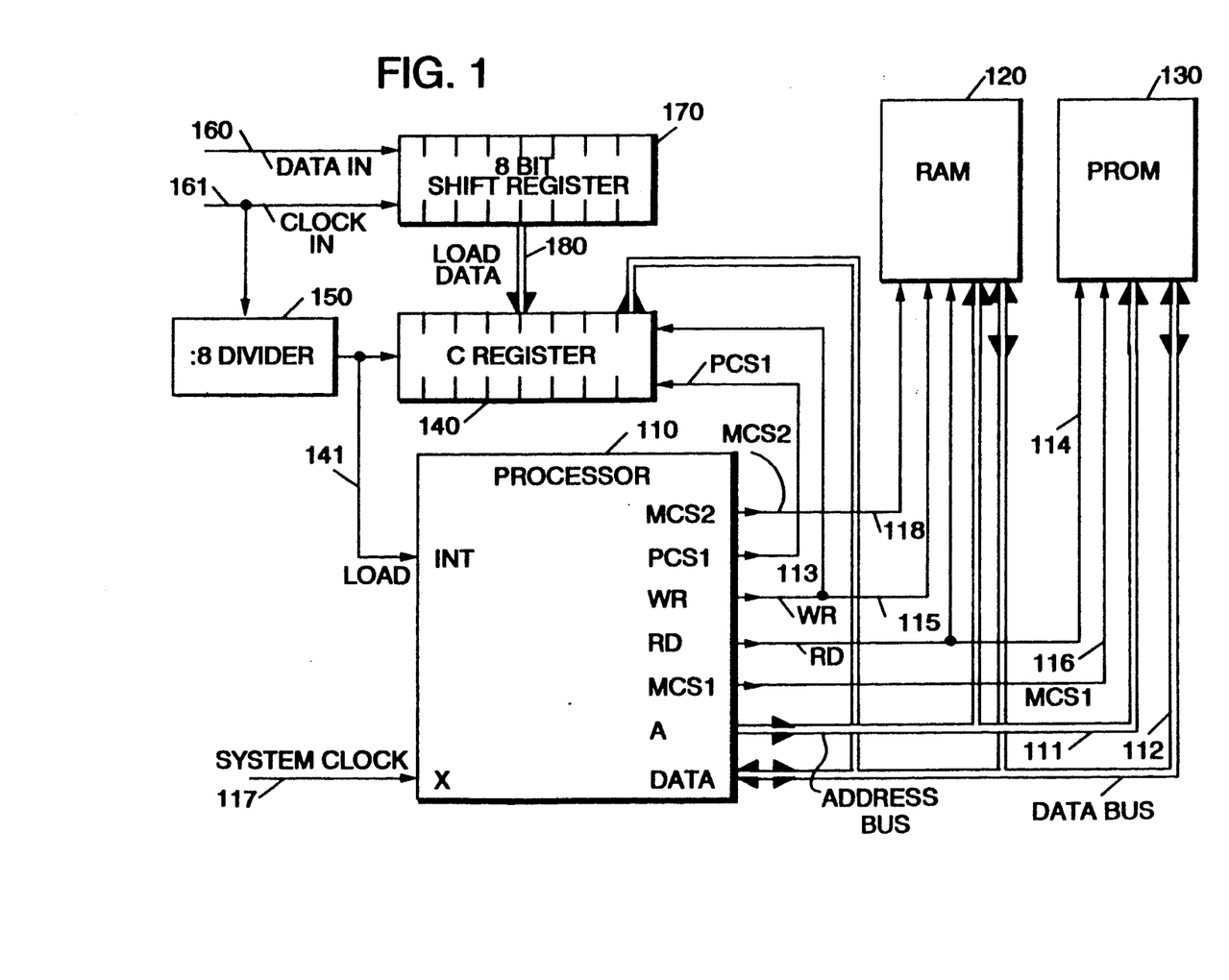
FIG. 1 is a schematic representation of the apparatus involved in the system (features numbered 1xx).

With respect to FIG. 1, the apparatus according to the invention includes a PROCESSOR 110 such as one of the 8088 Intel series. The processor is clocked by a SYSTEM CLOCK signal 117, and can communicate with the other components in the system by means of an ADDRESS BUS 111, a DATA BUS 112, PCS1 (Peripheral Chip Select 1) 113 lead, WR (WRite) 115 and RD (ReaD) 114 as well as MCS1 (Memory Chip Select 1) 116 and MCS2 (Memory Chip Select 2) 118 leads.

The apparatus further includes memory storage elements and in particular a RAM (Random Access Memory) 120, and a PROM (Programmable Read-Only Memory) 130. Also included are a 8-BIT SHIFT REGISTER 170, a C REGISTER 140 and a divider by eight (:8DIVIDER) 150.

Bit stream is incoming thru lead DATA IN 160, while timing on this lead is given by CLOCK IN signal 161, which is a clock signal at the rate of the incoming stream, extracted from the network by means that will not be described.

The analog interface with the network in general will not be part of the present description. The 8-BIT SHIFT REGISTER 170 is a conventional shift register, with 8 latches chained together and clocked by CLOCK IN signal 161, while input of the first latch is connected to DATA IN lead 160 and outputs of the 8 latches are connected to a bus: LOAD DATA 180, which itself is connected to the 8 memory points of the 8-bit C REGISTER 140 via enable means. Everytime :8DIVIDOR 150 counts eight pulses in CLOCK IN signal 161 it activates LOAD 141 lead which has two functions: first function is to activate the latter enable means which results in having C REGISTER 140 latch in its 8 memory points, the 8 current values of the 8 latches of 8-BIT SHIFT REGISTER 170 thru LOAD DATA bus 180, and second function is to awake PROCESSOR 110 thru its input INTerrupt and route its internal operating sequence to the appropriate routine according to the event.

Value present in C REGISTER 140 can then be read on request by PROCESSOR 110, by activating PCS1 113 and RD 114 leads; value will be present on DATA BUS 112. Regarding software description therunder (FIG. 2,3,4), C REGISTER 140 will also be referenced as register C.

PROM 130 contains all the software run by PROCESSOR 110. Fetching of operating instructions is performed by PROCESSOR 110 by activating RD 114 and MCS1 116 leads with a specific address present on ADDRESS BUS 111. Instruction data are then present on DATA BUS 112.

RAM 120 contains all operating intermediate registers necessary for PROCESSOR 110 to compute while running internal software. RAM 120 is accessed by activating MCS2 118 lead along with WR 115 or RD 114 leads, depending if PROCESSOR 110 is storing a value in RAM 120 (WR) or loading a value from RAM 120 (RD) into its internal registers.

The RAM register specific address will be set on ADDRESS BUS 111, while value to be stored in RAM will be set on DATA BUS 112, or value to be read from RAM will be sampled on the same bus by PROCESSOR 110.

Finally, SYSTEM CLOCK 117 is the clock for the PROCESSOR 110. Its frequency will depend on the type of processor used, but typically is in the 5 MHz range.

Figure 2:
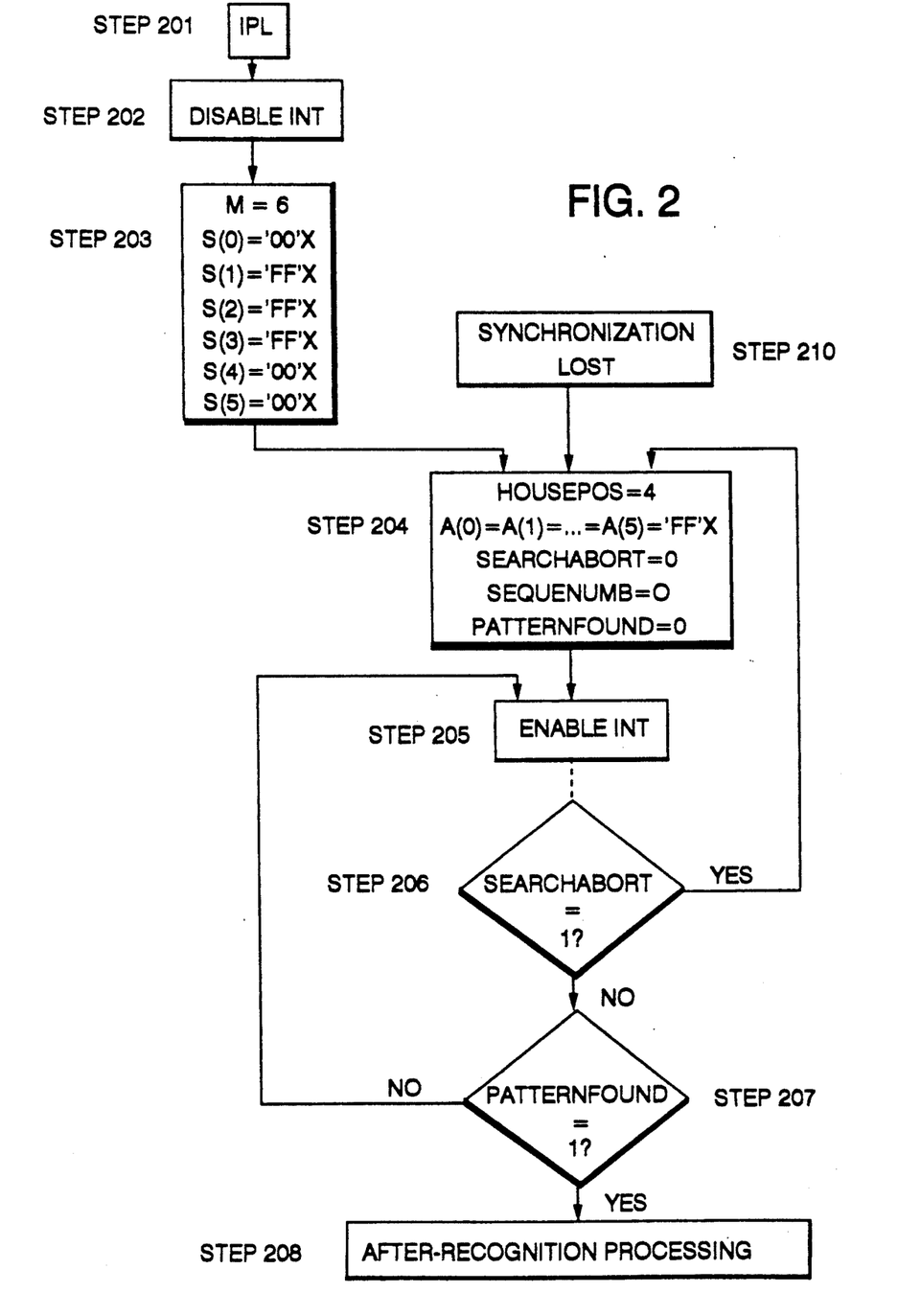
FIG. 2 is a flow chart showing the sequence of internal operations of the processor (main routine; steps numbered 2xx).
Figure 3:
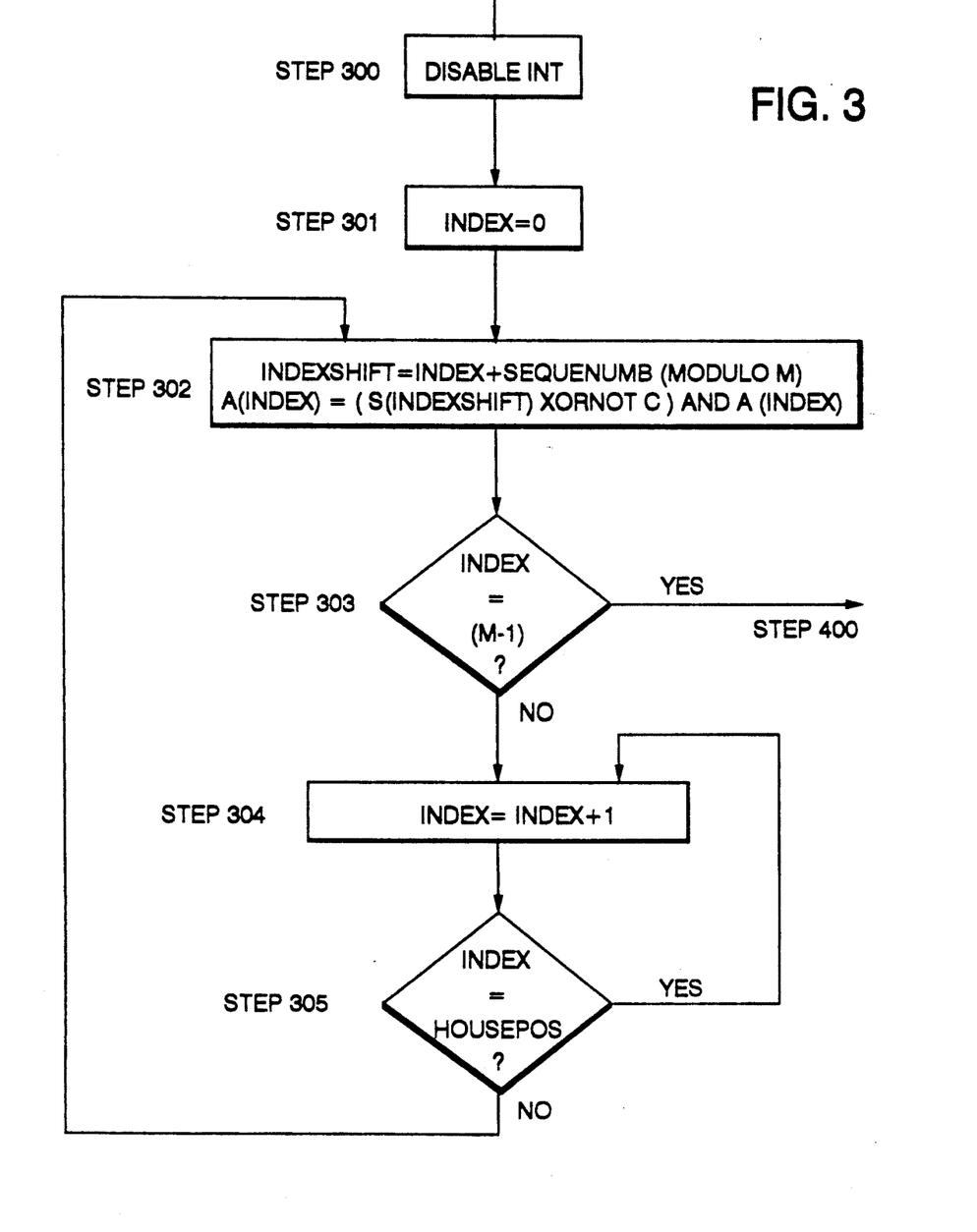
FIG. 3 is another flow chart for internal operations of the processor (interrupt routine; steps numbered 3xx).
Figure 4:
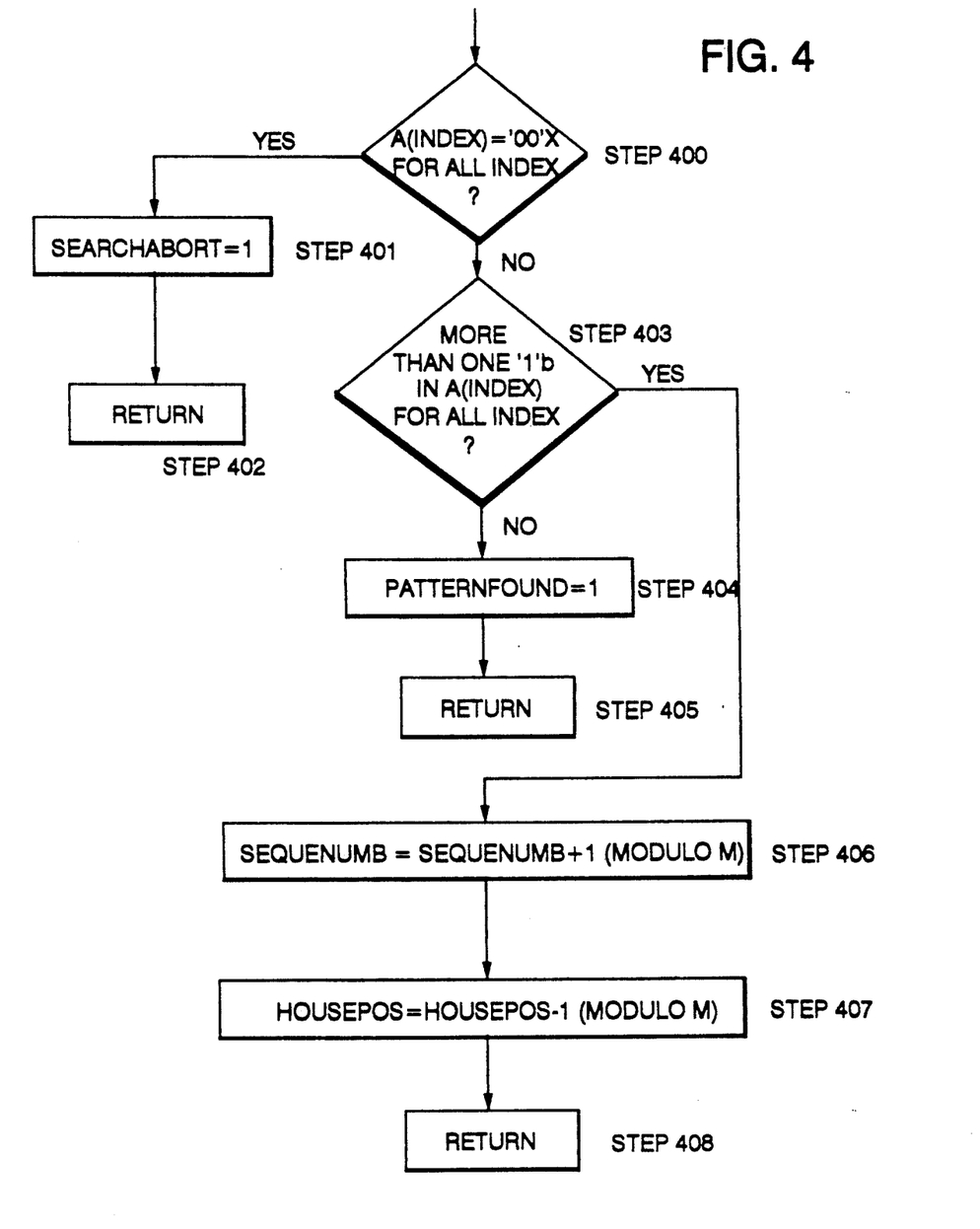
FIG. 4 is a last flow chart for internal operations of the processor (interrupt routine; steps numbered 4xx).

Detailed description will now continue with the PROCESSOR 110 operations as contained in PROM 130 with respect to FIG. 2, FIG. 3 and FIG. 4.

FIG. 2 shows the flowchart of operations for the main routine run by PROCESSOR 110 where two parts can be distinguished: the initialization process (steps 201 to 205) and the return-of-interrupt routine process (steps 206 to 208).

Steps 201 up to 205 are performed prior any branching to the interrupt routine. Step 201 (IPL) corresponds to a power-on or hard-reset of the machine where the described system is implemented. It is a standard set of PROCESSOR 110 internal operations not described here.

Step 202 is meant for disabling INT input of PROCESSOR 110 so that no external event can disturb the initialization process; INT input is made sensitive again with step 205 (ENABLE INT).

As for steps 203 and 204, they result in loading initial values in the different registers shared by PROCESSOR 110 routines. These registers are:

12 Registers of 8 bits each (M=6, N=8) :
S(0), S(1)...S(5) containing 8 bits equal to the value of each one of the 6 bits of the framing pattern: 0111H0.
A(0), A(1)...A(5) containing intermediate result after each return-of-interrupt routine.

Registers containing PROCESSOR 110 internal representation of an integer (could be 8-bit registers too):
M equals the number of bits in the framing pattern (6).
HOUSEPOS represents the current position for the housekeeping bit in the framing pattern (0 to 5).
SEARCHABORT equals 0 or 1 and is returned by interrupt routine depending on a next 'normal' computing sequence to be performed (0) or not (1).

SEQUENUMB has a value also returned by interrupt routine indicating the current computing sequence number (0 to 5).

PATTERNFOUND equals 0 or 1 and is returned by interrupt routine depending on detection achievement of the framing pattern.

Registers are loaded with initial values according to our example where S(0)='00000000'b, S(1)='11111111'b, S(2)='11111111'b, S(3)='11111111'b, S(4)='00000000'b, S(5)='00000000'b, A(i)='11111111'b for all i's, M equals 6, HOUSEPOS equals 4, SEARCHABORT, SEQUENUMB and PATTERNFOUND are set to 0. Note that S(4) corresponding to housekeeping bit in the framing pattern could be set to '11111111'b at initialization time all the same.

Figure 5A:
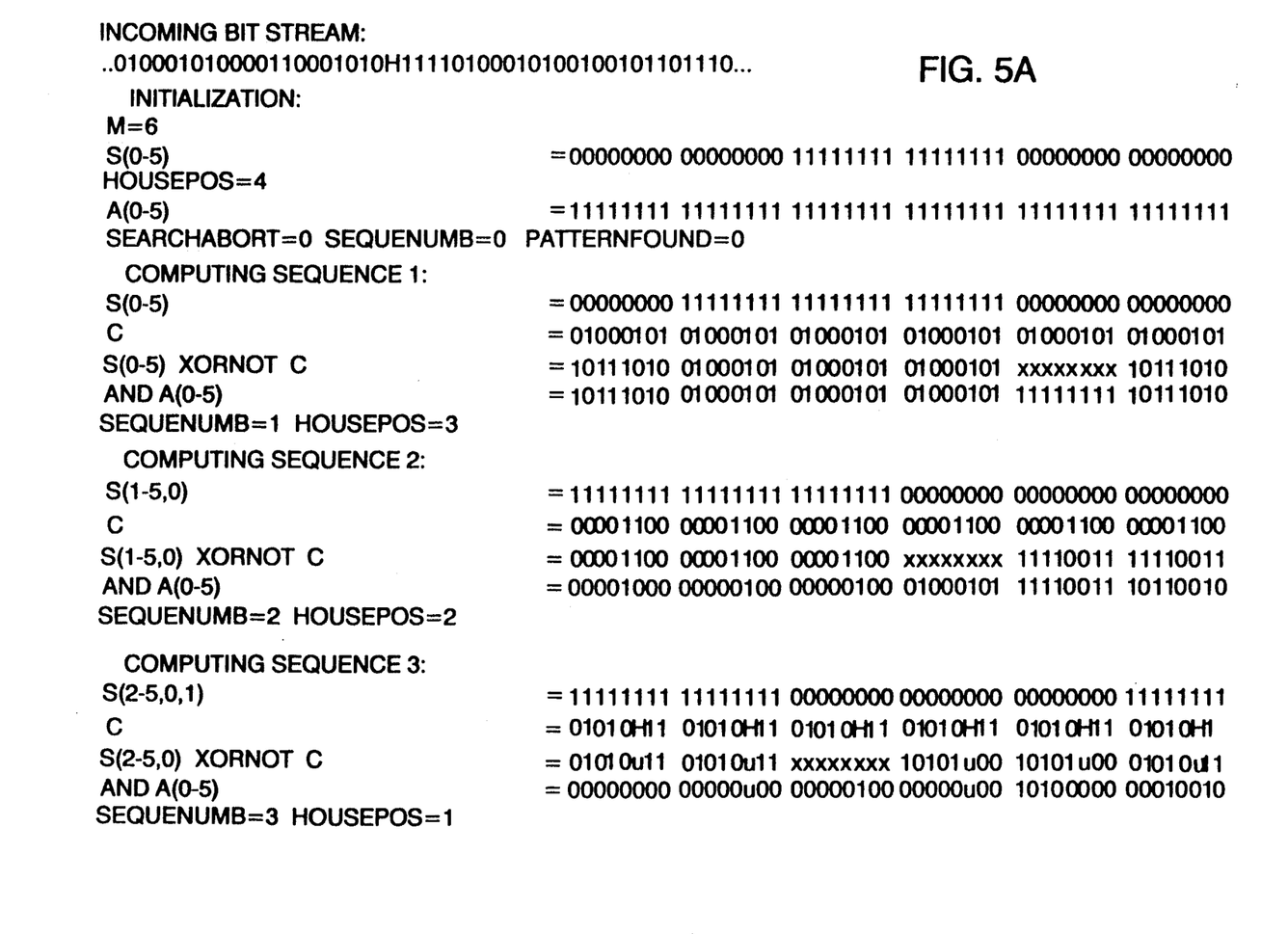
FIG. 5 shows the content evolution of different registers in a realistic example.
Figure 5B:
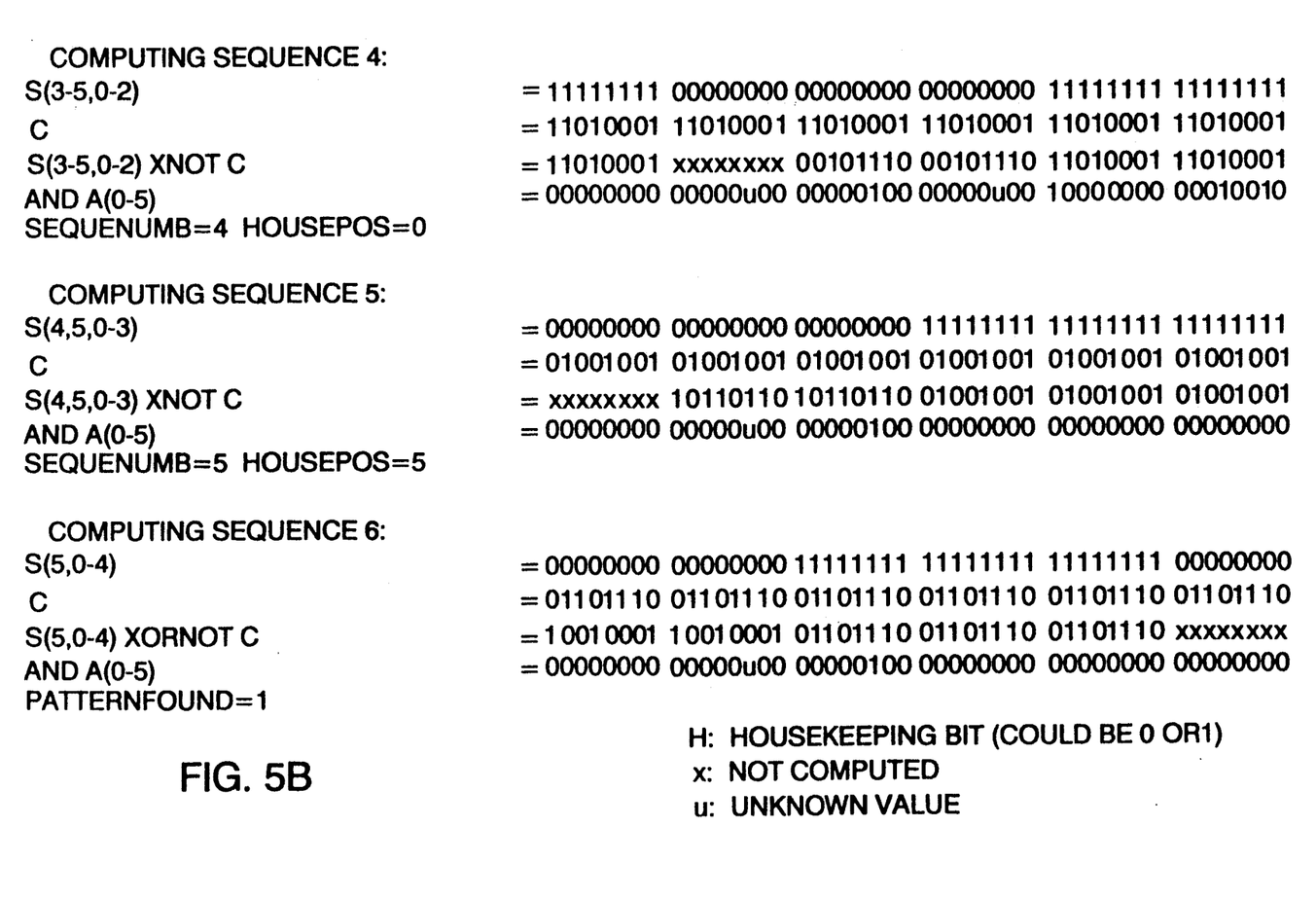

Return-of-interrupt-routine-process includes step 206 checking the returned value for SEARCHABORT; the different cases when SEARCHABORT equals 1 will be detailed with respect to FIG. 4. When SEARCHABORT equals 0, a checking on the value of PATTERNFOUND is then performed at step 207; the different cases when PATTERNFOUND equals 1 will be detailed with respect to FIG. 4 also; until those cases are met, a branch to step 205 is done, waiting for the next active signal on INT pin of PROCESSOR 110 to awake it and the interrupt routine run again. Each call to the interrupt routine and the associated computing operations performed within that routine, will be referenced as 'computing sequence' as a whole thereafter. Step 208 is the after-recognition processing which is not part of the invention. But it is noticeable that at this point, inputs to said processing made possible by the present invention, are:

the actual position in C REGISTER 140, of the one bit belonging to the framing pattern, the prediction of the next bit of that framing pattern present in the next group of incoming data that will be loaded into C REGISTER 140 (see also description regarding step 404 and FIG. 5).

Those inputs together with some further after-recognition processing, will allow the mere synchronization over incoming bit stream, of the telecommunication device the invention will be implemented into. Finally, step 210 corresponds to a loss in synchronization that has been detected by means not described in the present invention. Would such an event occur, a branch to step 204 would be necessary in order to re-start the whole recognition process provided by the invention.

FIG. 3 shows the flowchart of operations for one part (computing) of the interrupt routine run when INT becomes active, while FIG. 4 shows the second part of it (decision making after computing).

With respect to FIG. 3, first step 300 is meant for disabling INT input of PROCESSOR 110 so that no external event can disturb the interrupt routine; INT input is made sensitive again with step 205 (ENABLE INT) as soon as there is a return from interrupt routine. Two registers are introduced as INDEX (step 301) and INDEXSHIFT. INDEX is incremented from 0 up to 5 within one single computing sequence (step 304), in order to allow the computing coverage for all 6 of registers A(i)'s and S(i)'s. INDEXSHIFT is the result of the sum INDEX+SEQUENUMB modulo 6 (step 302); INDEXSHIFT will be worth 0 to 5 in the first computing sequence, 1 to 5 then 0 in the second, 2 to 5 then 0 and 1 in the third, etc... thus providing an 'artificial' rotating shift of the contents of all S(i) registers, at each new computing sequence. Computing includes a XOR-NOT (EQUAL) logical operation between S(i) and C registers (see also 140), as well as an AND logical operation between the result of the latter XORNOT operation, and A(i) registers. Step 303 checks for INDEX value to be equal to M−1 (5 in our example) in which case a branch is made to step 400, otherwise computing sequence continues with the next INDEX value, except when INDEX value equals HOUSEPOS value (checking performed at step 305). In that case, a skip is made to the next INDEX value without altering the current content of intermediate register A(INDEX).

Now, with reference to FIG. 4, a checking on the mere content of A(i) registers is performed for all i's. The first case that might happen, is that all A(i)'s contain only binary zeroes (step 400), in which case, SEARCHABORT is to be set to binary 1 (step 401) to indicate when RETURN to the main routine is done (step 402), that no further processing is possible, and a re-initialization of the whole recognition process is made necessary (that is a branch to step 204). This is typically the case when no framing pattern can be detected in the bit stream wether it is not yet being transmitted or the poor quality of the communication makes it hard to be recognized.

The second case that might happen, is that more than one binary one can be found in one or several A(i)'s, or one binary one can be found in one A(i) and another binary one in another A(i) (step 403), in which case SEQUENUMB is to be incremented (step 406) and HOUSEPOS decremented (step 407) to indicate when RETURN to the main routine is done (step 408), that further processing is necessary to achieve framing pattern detection (PATTERNFOUND still being equal to 0, that means a branch to step 205). This is typically the case when in the data portion of the bit stream, a 'look-alike' framing pattern prevents any unambiguous recognition of the 'true' framing pattern.

Finally, when only one binary one is left in only one A(i) (step 403), PATTERNFOUND is to be set to 1 (step 404) to indicate when RETURN to the main routine is done (step 405), that the framing pattern has been recognized within the bit stream. In that case, the mere position of the binary one within the A(i) register indicates the mere position of the framing pattern bit within the 8-bit groups of data from incoming serial bit stream, regularly loaded into C REGISTER 140. The 'i' index itself for which corresponding A(i) contains the only binary one left, indicates which one of the framing pattern bits will be present in the next 8-bit group of data from incoming serial bit stream, loaded into C REGISTER 140. Those two inputs allow a complete synchronization over the framing pattern (character synchronization and word synchronization).

Now, with respect to FIG. 5, the 'real' registers content is described from initialization (step 203 and 204) to recognition (computing sequence 6) of a framing pattern of the type 0111H0 imbedded in an incoming bit stream as shown. Each computing sequence corresponds to the incoming and loading into C REGISTER 140, of a new group of 8 bits in the bit stream, the activation of INT input of PROCESSOR 110 and the running of interrupt routine. One can well notice the 'artificial' rotating shift for the contents of S(i) registers performed at each new sequence, as well as the shift for the position where the computing is skipped (step 305) in order to leave the content for corresponding A(i) register unchanged thus identical to the content at previous computing sequence. Evolution of contents for SEQUENUMB, HOUSEPOS and PATTERN-FOUND parameters is also shown. Finally, 'u' stands for 'unknown' when the result of a logical operation involving the housekeeping bit H is unpredictable (H could be 0 or 1).

Pattern is being recognized at Computing sequence 6: one binary one is left in 6th position of register A(2). This piece of information allows for a complete synchronization over the framing pattern 0111H0 as we now know that any framing pattern bit will reside in 6th position of any 8-bit group of data from incoming serial bit stream loaded into C REGISTER 140, and that the next framing bit to be expected is a binary one following shifted sequence of 11H001 encountered at the various Computing sequences 1 to 6. Sufficient is this information for a synchronization process, not in the scope of the present invention, to operate bit shifts in order to achieve character synchronization, and character shifts in order to achieve 0111H0 word synchronization.

Although the invention has been described in a preferred embodiment, with reference to a particular pattern where M equals 6, N equals 8, and pattern itself is worth 0111H0, only minor modifications, within the ability of those skilled in the art, are needed to adapt it to any kind of framing pattern usually encountered in telecommunication industry.

I claim:

1. A method for recognizing a framing pattern of M single bits, with M being the number of bits in the framing pattern, distributed at intervals of a fixed number N of bits, with N being the number of bits as measured from the start of the framing bit to the start of the next, in an incoming serial bit stream, comprising the steps of:
   loading into each one of a plurality of first registers having multiple bits each, identical bit values equal to each one of the M bit values of said framing pattern, and
   initializing to a predetermined value the content of each one of a plurality of second registers having multiple bits each, and
   upon reception of N consecutive bits in said serial bit stream, loading the received bits into one single third register having multiple bits,
   said method being characterized in that it includes the steps of:
   performing a XORNOT logical operation between the contents of each one of said plurality of first registers and said third register, followed by an AND logical operation between the results of the latter XORNOT operation and the current contents of each one of said plurality of second registers, the final result being stored as new current contents for each one of said second registers, and
   checking the new current contents of each one of said plurality of second registers, and signalling the recognition of said framing pattern if only one binary one is left in only one of all said plurality of second registers.

2. Method according to claim 1 characterized in that it includes the steps of:
   checking the new current contents of each one of said plurality of second registers, and if only binary zeroes are left in all second registers: repeating the steps as recited above in claim 1 starting with initializing to all binary ones the content of each one of said second registers,
   checking the new current contents of each one of said plurality second registers, and if at least two binary ones are left among all second registers: operating a rotating shift between the contents of all said M first registers, and repeating the steps as recited above in claim 1 starting upon reception of a following group of N consecutive bits in the incoming serial bit stream.

3. Method according to claim 1 or 2 characterized in that it comprises:
   if said M-bit framing pattern contains one household bit at a fixed position in the pattern, which distinguishes over the (M−1) other bits in the pattern in that its value can vary from one pattern sequence to the other in the incoming bit stream, skipping the XORNOT and AND logical operations (step 305) as recited in claim 1 for said first, second and third registers corresponding to said fixed position in the pattern, thus leaving the current content for said corresponding second register unchanged.

4. Method according to claim 1, characterized in that upon recognition of said framing pattern, it includes :
   providing any after-recognition process for synchronization purpose over said incoming serial bit stream, with:
   which bit position among the N bit positions available in said third register, is dedicated to bits from said framing pattern, and
   which one among the M bits of said framing pattern, is next to be expected in the next group of N consecutive bits in the serial bit stream to be loaded into said third register.

5. In a telecommunication device, an apparatus intended for recognizing of a framing pattern of M single bits, M being the number of bits in the pattern, distributed at intervals of a fixed number, N of bits, N being the number of bits measured from the start of one frame bit to the start of the next, in an incoming serial bit stream comprising:
   a plurality of first registers having multiple bits each, and
   a plurality of second registers having multiple bits each, and
   third register of multiple bits, said apparatus being characterized in that it includes:
   means for, upon reception of N consecutive bits in said serial bit stream, loading the received bits into said third register, and awakening means performing a XORNOT logical operation between the contents of each one of said plurality of first registers and said third register, followed by an AND logical operation between the results of the latter XORNOT operation and the current contents of each one of said plurality of second registers, the final result being stored as new current contents for said plurality of second registers, and
   means for checking the new current contents of each one of said plurality of second registers to detect a framing pattern if one binary one is left in one of said plurality of second registers, wherein, if said framing pattern recognition is achieved, said apparatus provides any after-recognition apparatus implemented in said telecommunication device for synchronization purpose over said incoming serial bit stream, with:
   which bit position among the bit position available in said third register, is dedicated to bits from said framing pattern, and which bit position among the bit positions available in said third register, is dedicated to bits from said framing pattern, and which one among the bits of said framing pattern, is next to be expected in the next group of consecutive bits in the serial bit stream to be loaded into said third register.

6. The telecommunication device of claim 5 wherein the plurality of first registers equals the number of bits in the framing pattern and the number of bits in each one of the plurality of first registers equals N.

7. The telecommunications device of claim 6 wherein the plurality of second registers equals the number of bits in the framing pattern and the number of bits in each one of the plurality of second register equals N.

8. An apparatus for recognizing a framing pattern of bits within a stream of incoming serial bits comprising:

at least one first multibit register;

at least one second multibit register;

a third multibit register;

a first means for, upon reception of N consecutive bits in said serial bit stream, loading the received bit into said third multibit register;

awakening means for performing a XORNOT logical operation between the contents of said at least one first multibit register and said third register;

a second means for performing a logical AND operation between the results of the latter XORNOT operation and the current contents of said at least one second multibit register with the final results being stored as a new contents in said at least one second multibit register; and means for checking the new current contents for the at least one second multibit register to detect a framing pattern if one binary one is left in the at least one second multibit register.

* * * * *